United States Patent [19]

Heyes et al.

[11] 3,748,411

[45] July 24, 1973

[54] CARRIER SUPERVISORY ARRANGEMENTS

[75] Inventors: Roger Wallace Heyes, Basildon; Malcolm Charles Betts, Ilford; Helen Barbara Cranswick, Billericay, all of England

[73] Assignee: International Standard Electric Corporation, New York, N.Y.

[22] Filed: Aug. 23, 1971

[21] Appl. No.: 173,868

[30] Foreign Application Priority Data

Sept. 16, 1970 Great Britain .................. 44,179/70

[52] U.S. Cl. .................................... 179/170 A

[51] Int. Cl. .................................... H04b 3/36

[58] Field of Search .................. 179/170 A; 333/16; 179/15 BP

[56] References Cited

UNITED STATES PATENTS

| | | | |
|---|---|---|---|
| 3,414,687 | 12/1968 | Hermes et al. | 179/170 A |
| 3,414,688 | 12/1968 | Hermes et al. | 179/170 A |
| 3,483,334 | 12/1969 | Hermes | 179/170 A |
| 2,624,806 | 1/1953 | Wright et al. | 179/15 BP |

FOREIGN PATENTS OR APPLICATIONS

| | | | |
|---|---|---|---|
| 1,298,575 | 7/1969 | Germany | 179/170 A |
| 1,261,893 | 2/1968 | Germany | 179/170 A |

*Primary Examiner*—Thomas W. Brown

*Attorney*—C. Cornell Remsen, Jr., Delbert P. Warner et al.

[57] ABSTRACT

A pilot-controlled transmission system is disclosed for use on communication cables. The pilot-signal is detected at a master repeater station and control pulses indicative of its level are transmitted along the cable in the opposite direction to the signals. The control pulses control slave repeaters, each of which except the last, repeats the control pulses in the opposite direction to the signals. A power pick-off filter at the output of a repeater is arranged to pick off the control pulses and a power pick up filter at the input of a repeater is arranged to apply the control pulses to the cable.

6 Claims, 3 Drawing Figures

Inventor
R.W.HEYES-M.BETTS-
H.B.CRANSWICK
By D. J. Warner
Attorney

CARRIER SUPERVISORY ARRANGEMENTS

This invention relates to the control of the characteristics of repeaters in a telecommunication system in response to a pilot signal.

The normal method of controlling the repeater characteristic is to transmit a pilot signal via the transmission path and the repeaters and to pick it off at each repeater output. The pilot signal is then amplified and used to control the resistance of a thermistor in the feedback path of the repeater. The large physical size and the cost of the pilot pick off filter is an objection to the standard method and has lead to a search for alternative methods of repeater control.

The invention aims to provide a method by which a single filter can pick off the pilot signal and control a group of repeaters.

Accordingly, there is provided a transmission system in which groups of repeaters are spaced along a transmission path arranged to transmit both intelligence signals and power to the repeaters. The repeaters are adapted to have characteristics controllable by a control signal produced in response to a pilot signal transmitted from a control station via the transmission path and the repeaters. The repeater in each group which is furthest from the control station is adapted to produce in response to the pilot signal group control signals which are within the frequency band allotted for power transmission. Each repeater in the group is arranged to transmit the control signals over the transmission path to the preceding repeater in the group.

Figure 1:
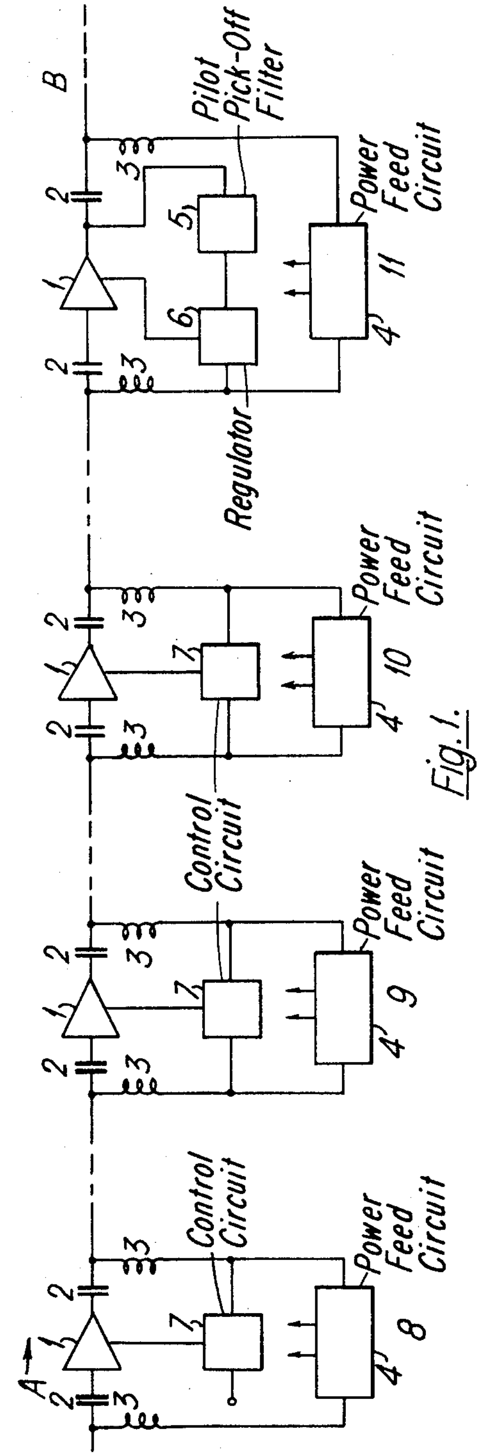
Figure 2:
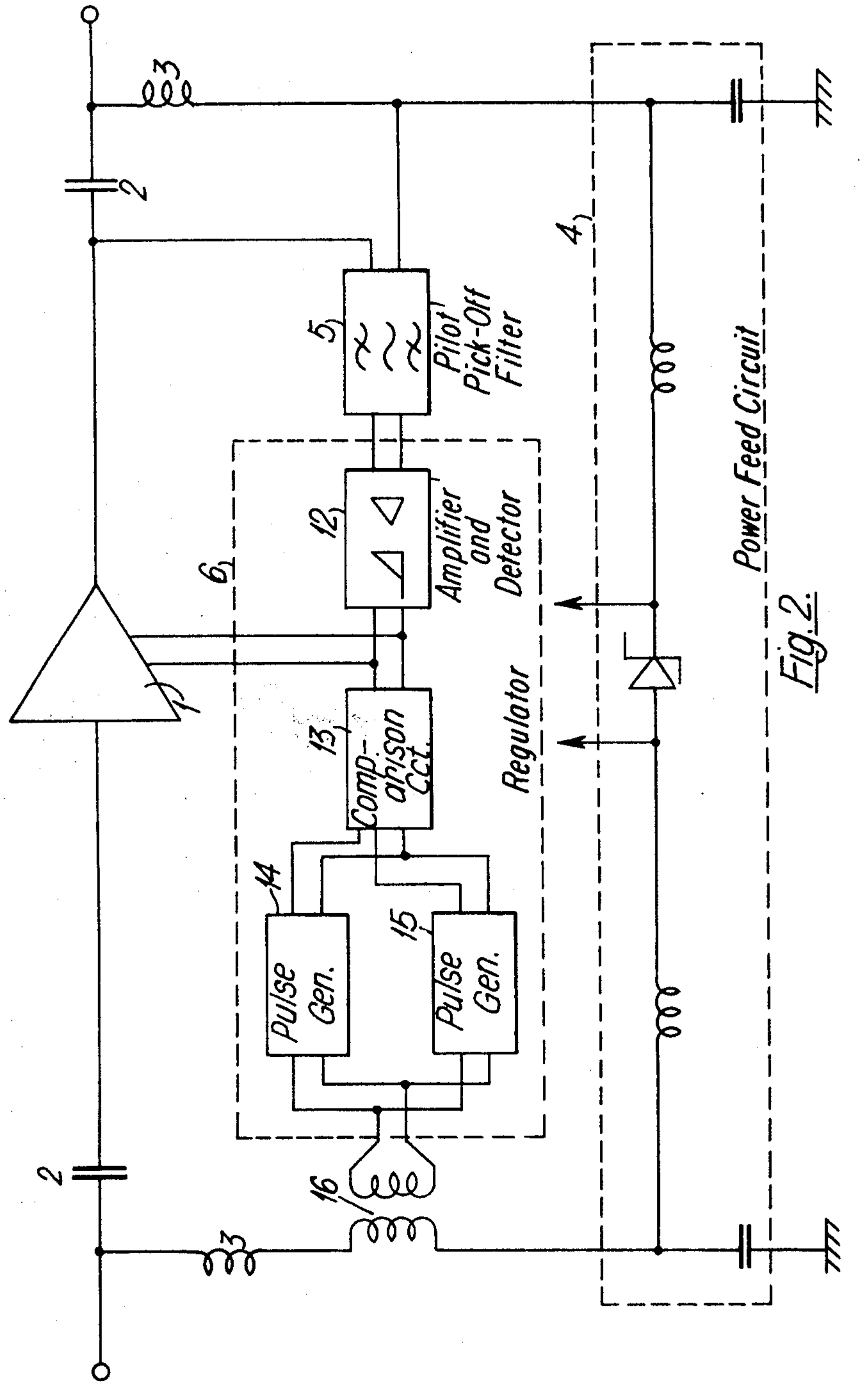
Figure 3:
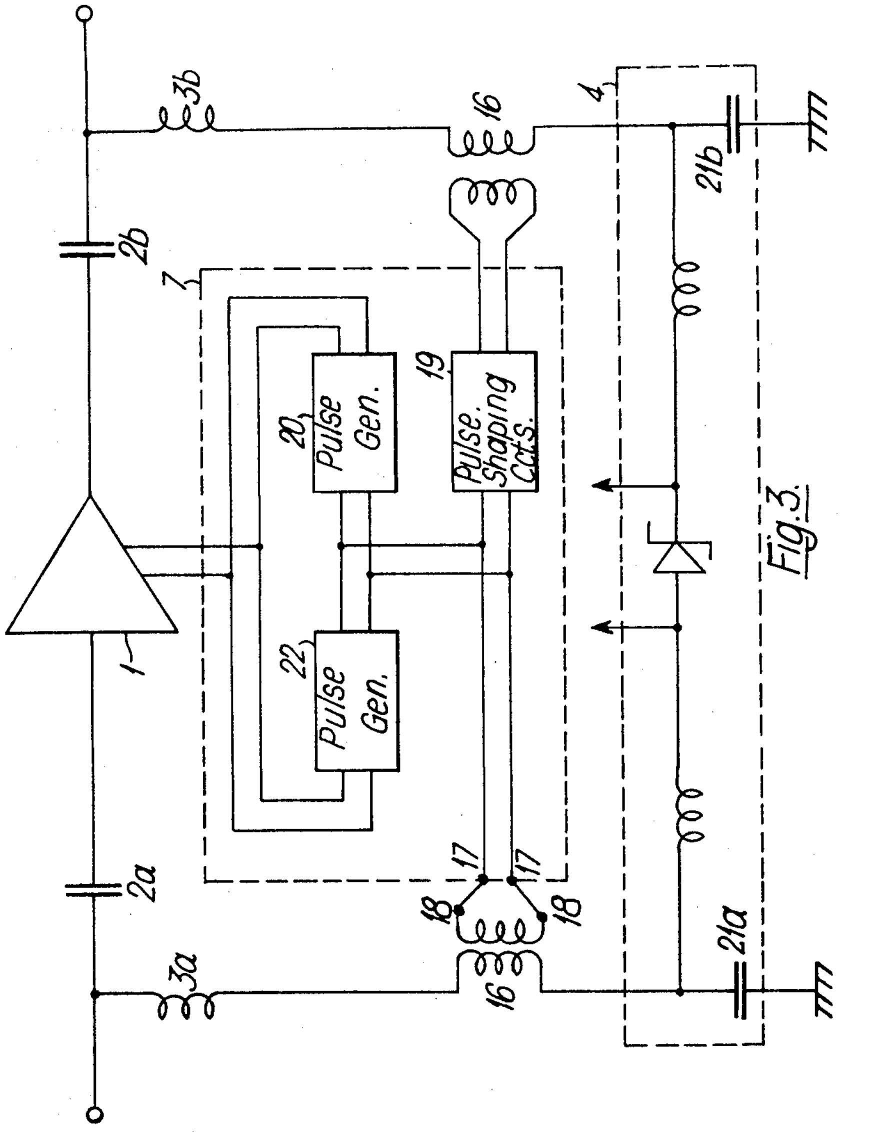

By way of example, an embodiment of the invention will now be described with reference to the accompanying drawings in which:

FIG. 1 shows a block circuit diagram of a group of repeaters according to the invention, FIG. 2 shows the circuit diagram of a group repeater furthest from the control station, and FIG. 3 shows the circuit diagram of the other repeaters in the group.

Referring to FIG. 1, the intelligence signal and the power are transmitted from A towards B via the repeaters 8, 9, 10 and 11. Each repeater includes a semiconductor feedback amplifier 1, power separating filters consisting of the capacitors 2 and inductors 3, and power feed circuits 4. Detailed connections from the power feed circuits to the amplifiers 1 are not shown.

At the repeater 11 which is furthest from the station at A which transmits the pilot signal, a pilot pick-off filter 5 has its input connected to the output of the amplifier 1 and its output connected to the input of a regulator 6. The regulator has two outputs, a first output connected to the termistor in a feedback circuit of a mplifier 1 and a second connected to the transmission path which is connected to the repeater input via the input section of the power separating filter.

The other repeaters in the group which in this embodiment are 8, 9 and 10 have the input of a control circuit 7 connected to the transmission path which is connected to the repeater output via the output section of the power separating filter. The control circuit has a first output connected to the thermistor in the feedback path of the amplifier 1 and in repeaters 9 and 10 it has a second output connected to the repeater transmission path which is connected to the repeater input via the input section of the power separating filter. In the repeater 8 in the embodiment, which is nearest to the station transmitting the pikot, the second output of the regenerator is not connected to the input section of the power separating filter.

Referring to FIG. 2, there is given the circuit diagram of the repeater 11 in greater detail. The components in this figure which correspond to those in FIG. 1 have corresponding numbers. The regulator 6 has its input connected via an amplifier to a detector circuit, shown as block 12, and the output of the detector is applied both to the thermistor in the feedback path of amplifier 1 and to the input of a comparison circuit 13. The two outputs of the comparison circuit 13 are applied respectively to the input of two pulse generators 14 and 15, the outputs of which are both applied via a transformer 16 and the input section of the power filter to the input transmission line to the repeater.

In operation the comparison circuit 13 samples the rectified pilot output of the amplifier and detector 12 and compares the samples with a DC reference signal corresponding to the nominal pilot level. If the sample signal is absent or below a threshold level the pilot is regarded as failed and a signal is produced at the first output which is connected to the pulse generator 14. This generator generates a train of pulses which continues while the signal is present at the first output of the comparison circuit 13. The output pulses of the generator 14 are applied via the transformer 16 and the input section of the power filter to the input transmission line and are transmitted in the reverse direction to the intelligence signal down that line to the other repeaters of the group.

The train of pulses has a duration and repetition frequency such that the control circuits in the other repeaters of the group adjust those repeaters until the pilot signal level is normal. When the sample is above the threashold level but below the level which corresponds to a normal pilot signal level, the comparison circuit 13 produces a signal at its second output and this signal is applied to the input of a further pulse generator 15. In response to this signal the pulse generator 15 generates a pulse which is transmitted to the other repeaters of the group in the same way as the output pulses of pulse generator 14. This pulse has a duration which is the shortest duration which can be transmitted within the power frequency transmission band., and if after a short duration the transmission of the pulse has not corrected the pilot to its normal level and so removed the output signal from the second output of the comparator 13 a further pulse is transmitted. This continues until the pilot is at its normal level.

In a particular embodiment for a system having a 12 Mhz intelligence signal bandwidth the band below the 300 Khz was used for power transmission only and the pulses transmitted had 100 micro second duration and 10 millisecond minimum time spacing. The pulses generated by pulse generator 14 were also 100 $\mu$S duration.

Referring to FIG. 3 this shows the circuit diagram for repeaters 9 and 10 and the components which correspond to those in FIG. 1 have corresponding numbers.

The control circuit 7 receives its input from a transformer 16 connected between the power pick-off filter to 3 which is connected to the output of the amplifier 1 and the output of the power feed circuit 4. The input signal is applied to a pulse shaping circuit 19, the output of which is connected to two pulse generators 20 and 22 and to a further transformer 16 the primary of which is connected between the input power pick-off filter to 3 and the input to the power feed circuit 4, the outputs of both pulse generators are connected to the thermistor in the feedback circuit of the amplifier 1.

In operation the capacitor 2*b* at the output of the amplifier 1 presents a high impedance to the pulse signals whereas the inductance 3*b* and the capacitor 21*b* present low impedances, consequently the control pulses are impressed with little attenuation and distortion on the input of the control circuit 7. The pulse shaping circuit 19 includes top and bottom limiters to remove noise from the pulses and an amplifier which restores them to their originally transmitted shape and level, these pulses are then transmitted via the second transformer 16 and the input power pick-off filter to the earlier repeaters of the group, the impedances of capacitors 2*a* and 21*a* and the inductor 3*a* corresponding to those of 2*b*, 21*b* and 3*b*. The pulses also trigger the pulse generator 20 which generates a pulse having a duration only slightly less than the minimum time spacing which can occur between any two consecutive pulses in the group control signals. The output of this pulse generator is applied to the thermistor and so controls its resistance and the characteristics of amplifier 1. Pulse generator 22 is similar to the pulse generator 14 in repeater 11 but includes in its output a gate circuit which is closed so long as pulses are present at the output of pulse shaping circuit 19. Consequently, it is only failure of these pulses which causes the output of the generator to be applied to the thermistor and so control the amplifier 1.

The repeater 8 is similar to the repeater just described except that the output terminals 17 of the control circuit 7 are not connected to the terminals 18 which are the primary terminals of the output transformer 16. Consequently, the group control pulses are not transmitted to a preceding group in the system.

Circuits suitable for inclusion in the blocks indicated in these embodiments are well known and in most cases a number of alternative configurations of circuit are also well known. The circuits are therefore not described further. Although the pulse generating circuits in this embodiment are described as separate pulse generators those skilled in the art would have no difficulty in combining them into one generator.

It is to be understood that the foregoing description of specific examples of this invention is made by way of example only and is not to be considered as a limitation on its scope.

We claim:

1. A transmission system comprising a plurality of repeaters spaced along a transmission path and arranged to transmit both intelligence signals and power, the repeaters being controllable by a signal produced in response to a pilot signal transmitted from a control station via the transmission path and the repeaters, the repeater which is furthest from the control station including means to produce control signals in response to the pilot signals, said control signals being selected to be transmitted in the frequency band below that allotted for intelligence transmission, each repeater including means to transmit said control signals over the transmission path to the preceding repeater in the group, a power pick-off filter at the output of a repeater is arranged to pick off the control signal and a power pick-off filter at the input of a repeater is arranged to apply the control signal to the transmission path.

2. A transmission system comprising a plurality of repeaters spaced along a transmission path and arranged to transmit both intelligence signals and power, the repeaters being controllable by a signal produced in response to a pilot signal transmitted from a control station via the transmission path and the repeaters, the repeater which is furthest from the control station including means to produce control signals in response to the pilot signal, said control signals being selected to be transmitted in the frequency band below that allotted for intelligence transmission, and each repeater including means to transmit said control signals over the transmission path to the preceding repeater in the group, said control signals being control pulses having a duration which is short compared with the time lapse between successive pulses and in which each repeater except the last is arranged to lengthen the received pulses and apply them to a thermistor in the control circuits of the repeater.

3. A transmission system comprising a plurality of repeaters spaced along a transmission path and arranged to transmit both intelligence signals and power, the repeaters being controllable by a signal produced in response to a pilot signal transmitted from a control station via the transmission path and the repeaters, the repeater which is furthest from the control station including means to produce control signals in response to the pilot signal, said control signals being selected to be transmitted in the frequency band below that allotted for intelligence transmission, and each repeater including means to transmit said control signals over the transmission path to the preceding repeater in the group, each repeater being arranged to produce pulses of a chosen duration and recurrence frequency in response to the absence of either a pilot signal or a control signal.

4. A transmission system according to claim 1, wherein said control signals are pulse signals having a duration and repetition frequency for transmission within the frequency band allocated for power transmission.

5. A transmission system according to claim 2, wherein said control pulses are transmitted within the frequency band allocated for power transmission.

6. A transmission system according to claim 3, wherein said control signals are transmitted within the frequency band allocated for power transmission.

* * * * *